United States Patent
Yoon et al.

(10) Patent No.: US 8,279,995 B2
(45) Date of Patent: Oct. 2, 2012

(54) GUIDE THIMBLE OF DUAL TUBE TYPE STRUCTURE NUCLEAR FUEL ASSEMBLY

(75) Inventors: Kyung Ho Yoon, Daejeon (KR); Jae Yong Kim, Daejeon (KR); Dong Seok Oh, Daejeon (KR); Young Ho Lee, Daejeon (KR); Kang Hee Lee, Daejeon (KR); Hyung Kyu Kim, Daejeon (KR)

(73) Assignees: Korea Atomic Energy Research Institute, Daejeon (KR); Korea Hydro and Nuclear Power Co., Ltd., Seoul (KR)

( * ) Notice: Subject to any disclaimer, the term of this patent is extended or adjusted under 35 U.S.C. 154(b) by 699 days.

(21) Appl. No.: 12/228,567

(22) Filed: Aug. 13, 2008

(65) Prior Publication Data

US 2009/0060117 A1    Mar. 5, 2009

(30) Foreign Application Priority Data

Aug. 14, 2007    (KR) .................. 10-2007-0081822

(51) Int. Cl.
*G21C 1/04*    (2006.01)
(52) U.S. Cl. ............... 376/438; 376/353; 376/224
(58) Field of Classification Search .......... 376/353, 376/438, 224, 213
See application file for complete search history.

(56) References Cited

U.S. PATENT DOCUMENTS

| | | | | |
|---|---|---|---|---|
| 3,878,870 A | * | 4/1975 | Atherton et al. | 376/352 |
| 4,252,613 A | | 2/1981 | Jabsen | |
| 4,777,016 A | * | 10/1988 | Yoshioka et al. | 376/444 |
| 5,263,072 A | * | 11/1993 | Canat et al. | 376/439 |
| 5,465,282 A | * | 11/1995 | Berglund | 376/426 |

FOREIGN PATENT DOCUMENTS

GB    2 307 330 A    5/1997

* cited by examiner

*Primary Examiner* — Ricardo Palabrica
(74) *Attorney, Agent, or Firm* — Merchant & Gould P.C.

(57) ABSTRACT

Disclosed herein is a guide thimble of a nuclear fuel assembly, which is capable of improving the cooling performance and the stability of a nuclear fuel, preventing a flow split in dual-cooling nuclear fuel rod and guide thimble sub channels for obtaining high combustion degree and high power, and minimizing a neutron absorption section in a reaction degree region. Since the guide thimble having the dual tube type structure is adopted, a flow split in the fuel rod and guide thimble sub channels can be reduced, and the degradation in performance of nuclear fuel due to increase of a neutron absorption section can be prevented. In order for compatibility with an existing control rod, a typical guide tube is used as an inner guide thimble, and an outer guide thimble is provided outside the inner guide thimble. Thus, the guide thimble has the dual tube type structure as a whole, and is coupled to the upper and lower end fittings so that it can prevent a flow unbalance due to the flow split in the fuel rod and guide thimble sub channels.

5 Claims, 7 Drawing Sheets

GUIDE THIMBLE OF DUAL TUBE TYPE STRUCTURE NUCLEAR FUEL ASSEMBLY

BACKGROUND OF THE INVENTION

1. Field of the Invention

The present invention relates to a guide thimble of a nuclear fuel assembly to which a dual-cooling nuclear fuel rod is applied for ensuring stability even at ultra-high combustion degree by reducing a center temperature and obtaining an economic effect by increasing power, and more particularly, to a guide thimble of a dual tube type structure for a nuclear fuel assembly, which is capable of ensuring an uniform flow inside a reactor core by preventing a flow split phenomenon between a nuclear fuel rod sub channel and a guide thimble sub channel, and minimizing the increase of a neutron absorption section to improve performance of a dual-cooling nuclear fuel rod.

2. Description of the Related Art

FIG. 1 is a schematic perspective view showing a conventional nuclear fuel assembly, FIG. 2 is a schematic plan sectional view showing the section of the conventional nuclear fuel assembly, and FIG. 3 is a schematic plan sectional view showing a nuclear fuel rod having a dual-cooling structure.

As shown in FIG. 1, the nuclear fuel assembly 100 includes a nuclear fuel rod 110, a guide thimble 140, a spacer grid assembly 150, an upper end fitting 120, and a lower end fitting 130.

As shown in FIG. 2, the nuclear fuel rod 110 includes a cylindrical uranium pellet within a zirconium-alloy cladding tube, and high-temperature heat is generated by a nuclear fission reaction of the uranium pellet.

Meanwhile, the guide thimble 140 is configured with a single tube that provides a moving path of a control rod 160 moving upward and downward in order to control a power of a nuclear reactor core and stop a nuclear fission reaction. The spacer grid assembly 150 is one of constituent parts of the nuclear reactor fuel assembly and functions to support the nuclear fuel rod 110 such that it is arranged at a predetermined position due to a friction force that is generated by a friction between the nuclear fuel rods and the spacers formed in each grid of the spacer grid assembly 150.

The spacer grid assembly 150 is generally made of zirconium alloy, and it includes nuclear fuel rod cells supporting the nuclear fuel rods 110, and guide thimble cells into which the guide thimbles 140 are inserted. An annular uranium dioxide pellet is inserted into the nuclear fuel rod 110. A coolant flows quickly from the lower portion to the upper portion of the reactor core in an axial direction through a sub channel 115, which is surrounded by four nuclear fuel rods 110, or a sub channel 115, which is surrounded by twelve nuclear fuel rods 110 and one guide thimble 140.

The sub channel 115 represents a space surrounded by the nuclear fuel rods 110 or a space surrounded by the nuclear fuel rods 110 and the guide thimble 140. Since the side of the sub channel 115 is opened, fluid can move freely to an adjacent passage.

The upper end fitting 120 and the lower end fitting 130 function to fix and support the nuclear fuel assembly 110 to upper and lower structures of the nuclear core. In particular, the upper end fitting 120 connects the upper portion of the reactor core to the nuclear fuel assembly 100 to prevent the shaking of the reactor core and the nuclear fuel assembly 100, and prevents the lifting due to the coolant flow. The lower end fitting 130 includes a filter (foreign particle filter) (not shown) for filtering foreign particles floating inside the reaction core, in addition to the function of supporting the nuclear fuel assembly 100 inwardly to the reaction core.

As shown in FIG. 1, the upper end fitting 120 includes an outer guide post 121, a press spring 122, a press plate 123, a passage plate 124. Four outer guide posts 121 are screwed to the guide thimble 140, and the passage plate 124 allows the coolant to properly flow upward within the reactor core.

In addition, the lower end fitting 130 includes a passage hole for proper flow of the coolant, a passage plate where a hole is perforated for connecting the guide thimble 140 to a measuring tube, and a leg for maintaining the position of the nuclear fuel. The lower end fitting 130 redistributes the coolant, supports the nuclear fuel assembly 100, and filters foreign particles.

Meanwhile, as shown in FIG. 3, instead of the conventional cylindrical nuclear fuel rod 110, a dual-cooling nuclear fuel rod 10 was developed in order to improve the cooling performance and the stability of the nuclear fuel and obtain high combustion degree and high power. The dual-cooling nuclear fuel rod 10 has an annular structure having an increased outer diameter, compared with the conventional nuclear fuel rod 110.

The dual-cooling nuclear fuel rod 10 having the annular structure includes an annular pellet 11, an inner cladding tube 12 provided in an inner periphery, and an outer cladding tube 13 provided in an outer periphery. The coolant can flow into the inside of the dual-cooling nuclear fuel rod 10 as well as the outside thereof, so that heat transfer is achieved in dual manner. Therefore, the surface temperature of the dual-cooling nuclear fuel rod 10 is kept low and the probability of the fuel damage due to the increase in the center temperature of the nuclear fuel is reduced. Thus, a safety margin of the dual-cooling nuclear fuel rod 10 is increased, thereby obtaining high combustion degree and high power.

However, if the guide thimble 140 having the single tube type structure used in the conventional nuclear fuel assembly 100 is adopted for compatibility with the existing reactor core structure (control rod and neutron source assembly), a flow split is generated by a pressure difference caused by a difference of a hydraulic diameter in the dual-cooling nuclear fuel rod (10) sub channel and the guide thimble (140) sub channel. Since the flow split phenomenon increases the flow in the guide thimble (140) sub channel, it is difficult to obtain the low-temperature high-power performance which is the greatest advantage of the dual-cooling structure.

To solve the problem, the hydraulic diameter in the guide thimble (140) sub channel must be similar to the hydraulic diameter in the dual-cooling nuclear fuel rod (10) sub channel. To this end, the thickness of the guide thimble 140 must be increased, or separate components such as a sleeve must be added to the conventional guide thimble 140 having the single tube type structure.

In the case of increasing the thickness of the conventional guide thimble 140 having the single tube type structure, the hydraulic diameter can be made similar to that of the dual-cooling nuclear fuel road 10, but the neutron absorption section absorbing neutrons is increased because the guide thimble 140 is made of zircaloy.

Furthermore, if the sleeve is inserted into the conventional guide thimble 140, the flow split can be reduced, but the increased section of the guide thimble 140 made of zircaloy increases the nuclear absorption section in a reaction degree region inside the reactor core. Therefore, the nuclear fission reaction is reduced, causing the reduction in the output of the reactor core. Moreover, the process of inserting the sleeve becomes complicated, causing the great reduction of productivity.

SUMMARY OF THE INVENTION

Accordingly, the present invention has been made keeping in mind the above problems occurring in the prior art, and an object of the present invention is to provide a guide thimble of a dual tube type structure for a nuclear fuel assembly, which is capable of improving the cooling performance and the stability of a nuclear fuel, preventing a flow split in dual-cooling nuclear fuel rod and guide thimble sub channels for obtaining high combustion degree and high power, and minimizing a neutron absorption section in a reaction degree region.

In order to accomplish the above object, the present invention provides a guide thimble of a dual tube type structure for a nuclear fuel assembly having a dual-cooling nuclear fuel rod, the guide thimble including: an inner guide thimble through which a control rod for neutron deceleration passes; and an outer guide thimble receiving the inner guide thimble.

Also, the inner guide thimble may have the same geometrical shape as the conventional guide thimble of a single tube type structure, and an outer diameter and an inner diameter of the outer guide thimble may be determined so that a difference between a hydraulic diameter of the dual-cooling nuclear fuel rod sub channel and a hydraulic diameter of the guide thimble sub channel is within 15%.

Also, the guide thimble of the dual tube type structure may further include an end fitting at a lower portion of the guide thimble. The end fitting may have a cylindrical shape, and a groove into which the inner guide thimble is inserted may be formed on the top surface of the end fitting in a circumferential direction. A stepped portion into which the outer guide thimble is inserted may be formed in the outer periphery of the end fitting, and a male screw may be formed in a lower portion of the end fitting.

Also, the lower portions of the inner guide thimble and the outer guide thimble may be respectively inserted into the groove and the stepped portion of the end fitting and then welded.

Also, the guide thimble of the dual tube type structure may further include: a nut having a flange surface at an upper portion such that the nut is coupled to the male screw of the end fitting; and a locking disc closely attached to an outer surface of the nut. The locking disc may be welded to the lower surface of the lower end fitting of the nuclear fuel assembly.

Furthermore, the guide thimble of the dual tube type structure may further include a flange at an upper portion of the guide thimble. A lower end of the flange may be welded to an upper end of the inner guide thimble, and an outer surface of the flange may be welded to an inner diameter of the outer guide thimble. A female screw may be formed on an inner wall of the flange.

At this point, the female screw of the flange may be screwed to an outer guide post having a male screw at an outer diameter portion thereof, such that the flange is coupled to a passage plate of the upper end fitting of the nuclear fuel assembly.

Moreover, coolant discharge holes may be further formed at the upper and lower portions of the inner guide thimble and the outer guide thimble.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
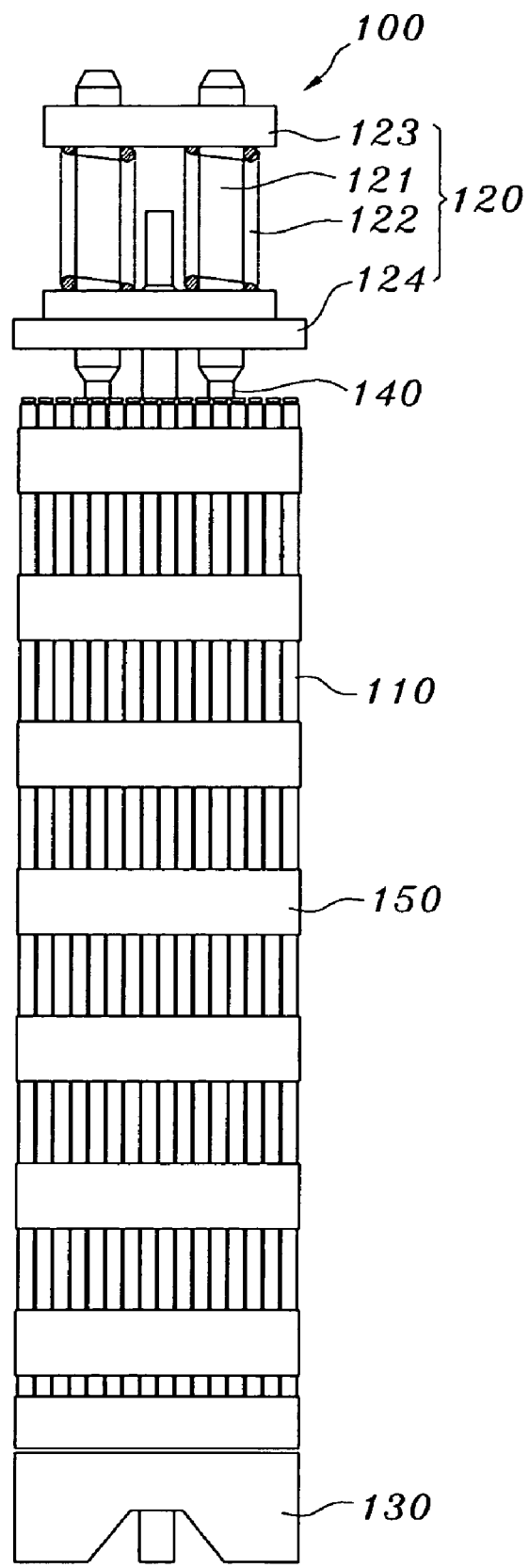
FIG. 1 is a schematic perspective view showing a conventional nuclear fuel assembly.
Figure 2:
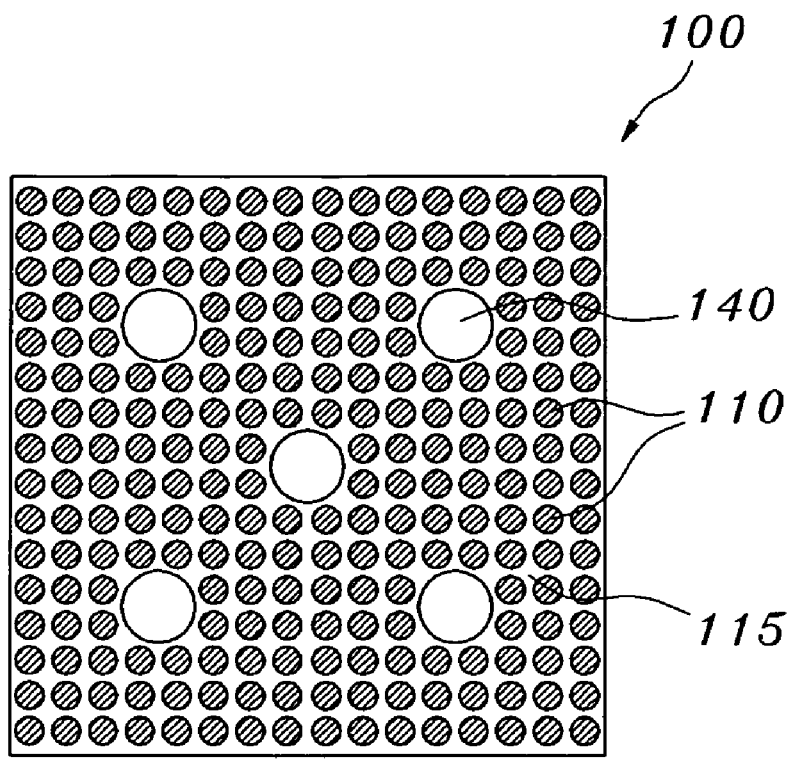
FIG. 2 is a schematic plan sectional view showing the section of the conventional nuclear fuel assembly.
Figure 3:
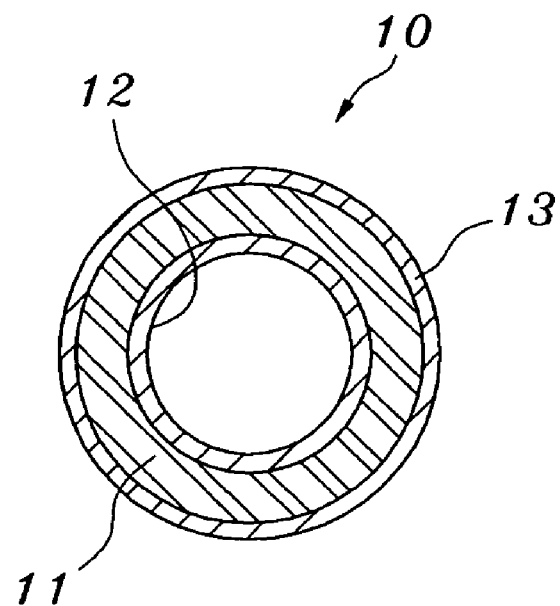
FIG. 3 is a schematic plan sectional view showing a dual-cooling nuclear fuel rod according to an embodiment of the present invention.

Reference now should be made to the drawings, in which the same reference numerals are used throughout the different drawings to designate the same or similar components.

Figure 4:
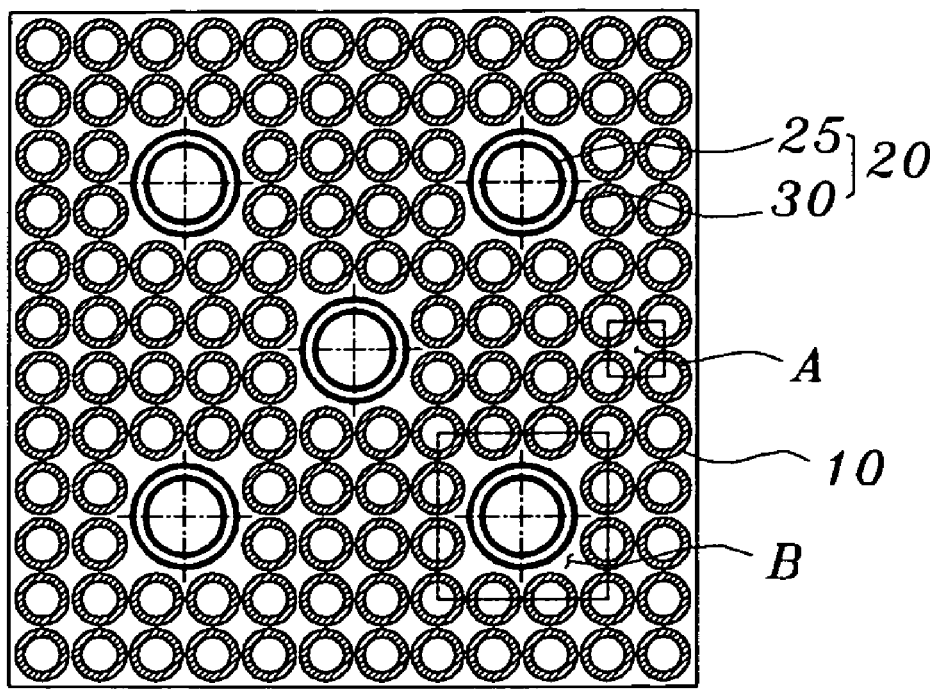
FIG. 4 is a schematic plan sectional view illustrating the section of a dual-cooling nuclear fuel assembly according to an embodiment of the present invention.
Figure 5:
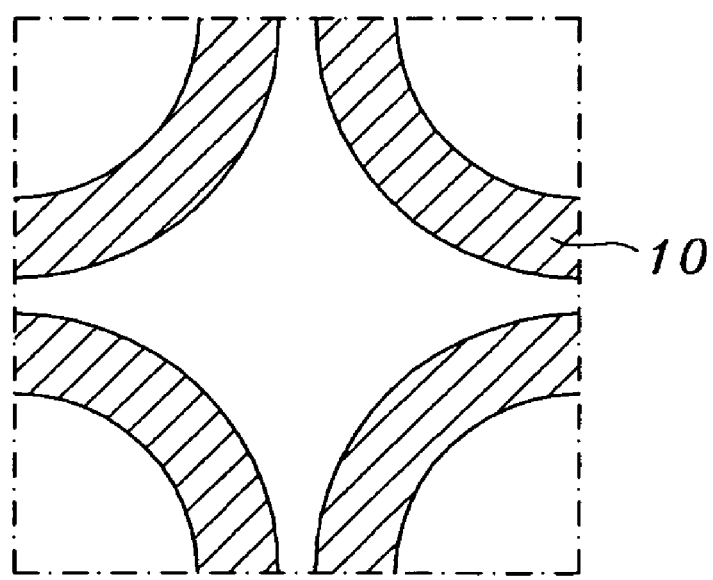
FIG. 5 is a detailed enlarged view of a portion 'A' of FIG. 4.
Figure 6:
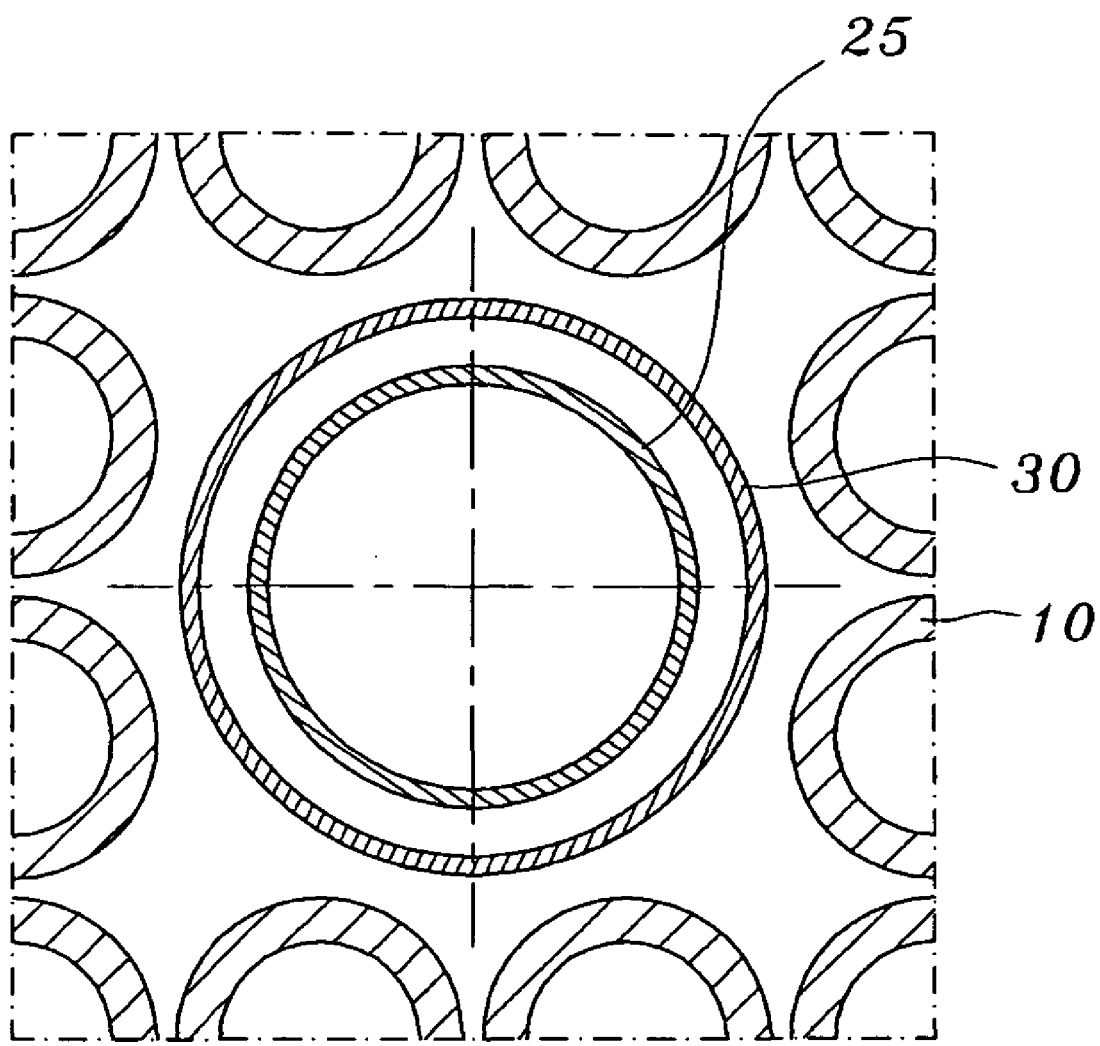
FIG. 6 is a detailed enlarged view of a portion 'B' of FIG. 4.
Figure 7:
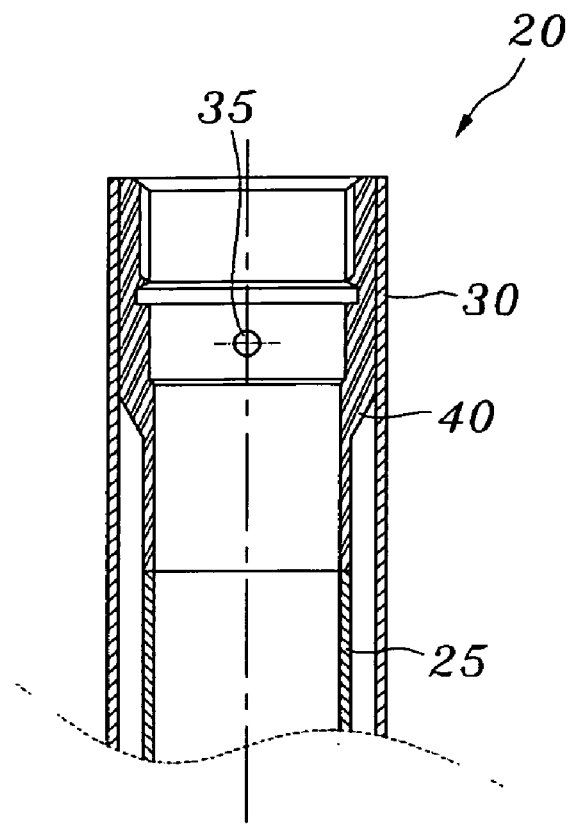
FIG. 7 is a schematic front view illustrating a guide thimble having a dual tube type structure according to an embodiment of the present invention.
Figure 7:
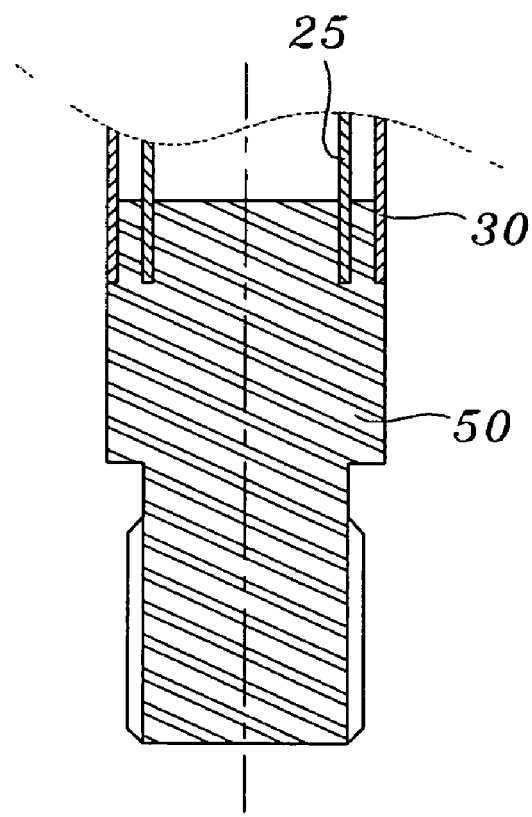
Figure 8:
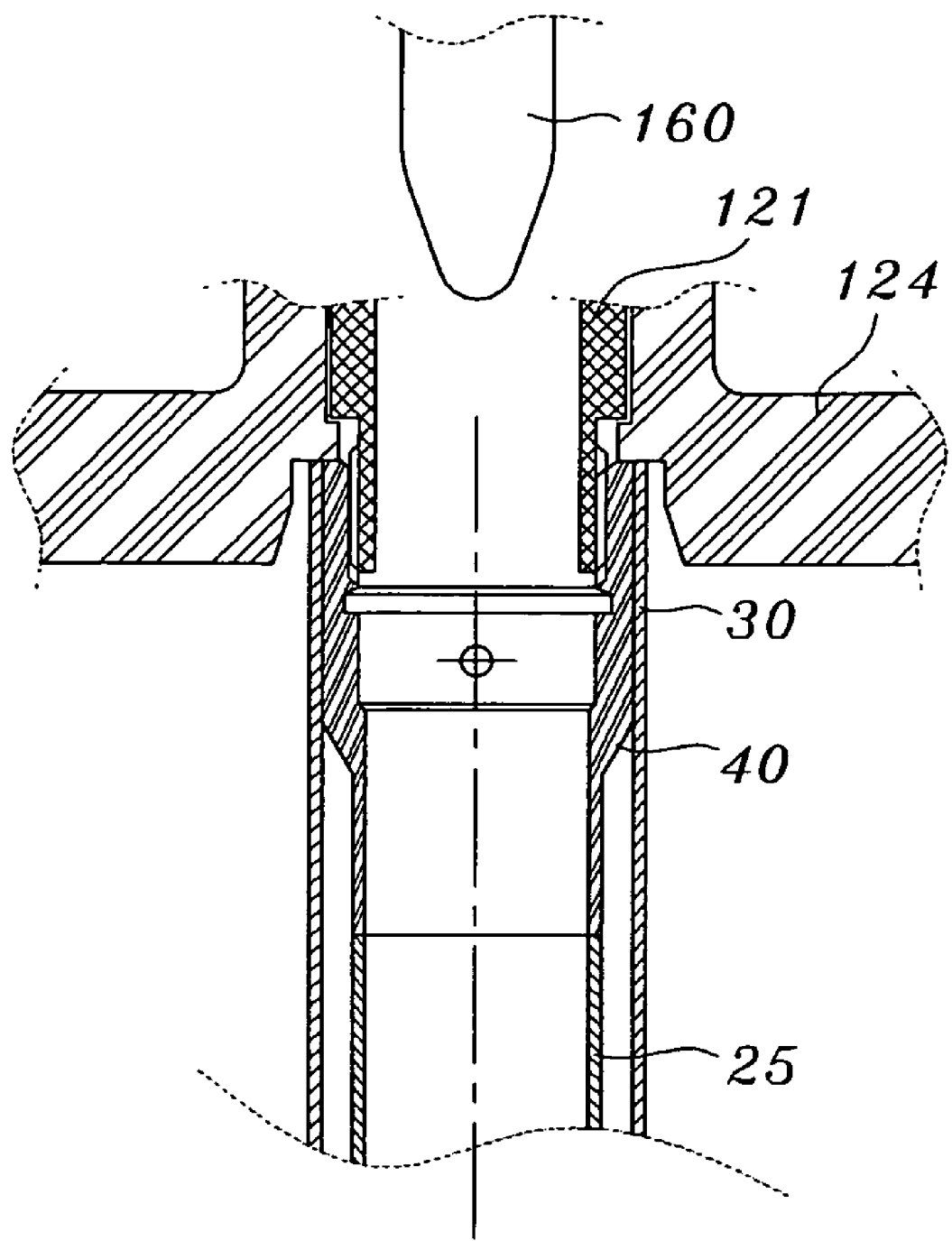
FIG. 8 is a schematic front view illustrating connection of the guide thimble having the dual tube type structure and an upper end fitting.
Figure 9:
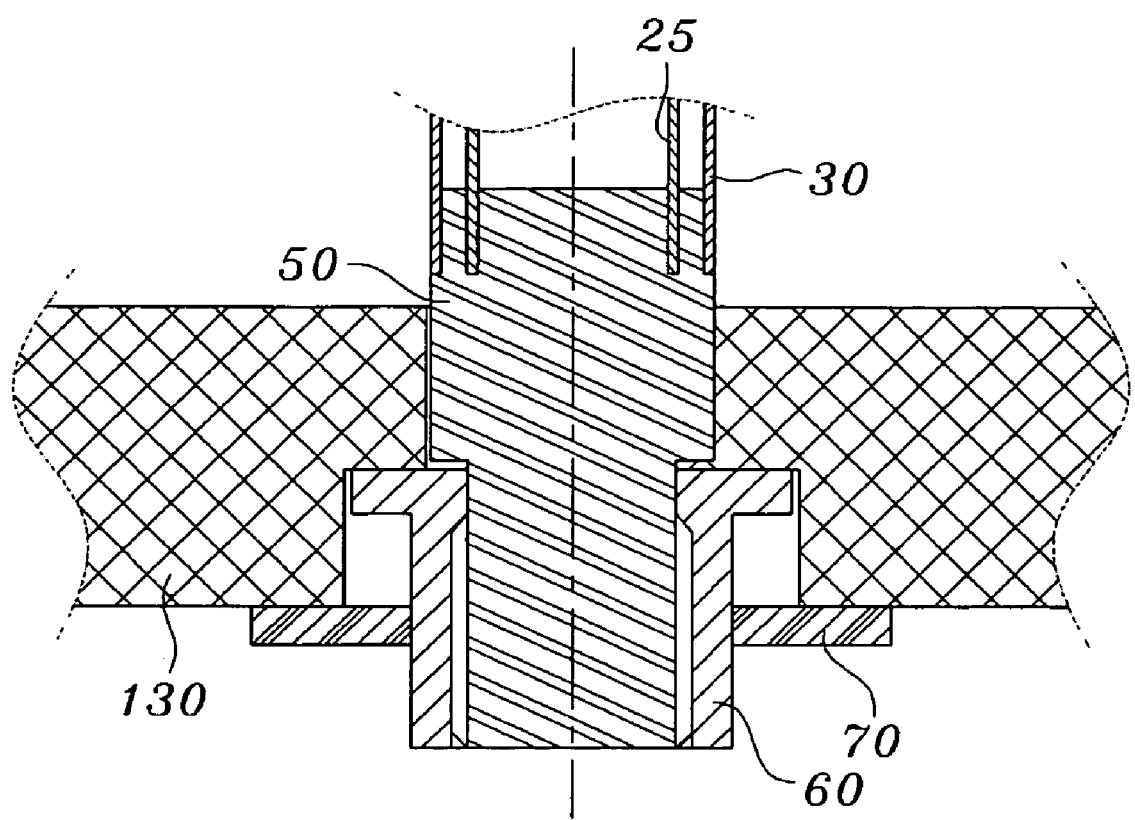
FIG. 9 is a schematic front view illustrating connection of the guide thimble having the dual tube type structure and a lower end fitting.

FIG. 4 is a schematic plan sectional view illustrating a section of a dual-cooling nuclear fuel assembly to which the present invention is applied. FIG. 5 is a detailed enlarged view of a portion 'A' that represents a dual-cooling nuclear fuel rod sub channel of FIG. 4. FIG. 6 is a detailed enlarged view of a portion 'B' that represents a guide thimble sub channel. FIG. 7 is a longitudinal sectional view illustrating a guide thimble having a dual tube type structure according to an embodiment of the present invention. FIG. 8 is a schematic view illustrating connection of the upper portion of the guide thimble having the dual tube type structure and the upper end fitting. FIG. 9 is a schematic view illustrating connection of the lower portion of the guide thimble having the dual tube type structure and the lower end fitting.

As shown, the guide thimble 20 having the dual tube type structure includes an inner guide thimble 25 and an outer guide thimble 30. A control rod 160 for neutron deceleration moves through an inner space of the inner guide thimble 25.

The inner guide thimble 25 is formed in the same geometrical shape as the single tube type guide thimble 140 used in a conventional nuclear fuel assembly 100 having a cylindrical nuclear fuel rod, so that the control rod 160 is movable through the inner space. This is indispensably required for compatibility with an existing internal structure of a reactor core.

In this embodiment, like the conventional single tube type guide thimble 140, the inner guide thimble 25 has an inner diameter of 22.86 mm, an outer diameter of 24.9 mm, and a tube thickness of 1.02 mm.

The outer guide thimble 30 has a greater diameter than the inner guide thimble 25, and the inner guide thimble 25 is received in the outer guide thimble 30. Therefore, it is preferable to select a diameter at which the hydraulic diameter of the guide thimble sub channel B is similar to that of the dual-cooling nuclear fuel rod sub channel A in view of the hydraulics in order to prevent degradation of the cooling performance due to a flow split between the dual-cooling nuclear fuel rod (10) sub channel A and the guide thimble sub channel B.

The dual-cooling nuclear fuel rod (10) sub channel A represents a coolant flow passage surrounded by four adjacent dual-cooling nuclear fuel rods 10, and the guide thimble sub channel B represents a coolant flow passage surrounded by one guide thimble 20 having the dual tube type structure and twelve dual-cooling nuclear fuel rods 10 arranged around the guide thimble 20 having the dual tube type structure.

In this embodiment, the outer guide thimble 30 has an inner diameter of 30.44 mm, an outer diameter of 32.48 mm, and a tube thickness of 1.02 mm.

The hydraulic diameter means a diameter obtained by changing a ratio of a wet length by a fluid flowing through a passage having a non-circular section to an area of an actual passage into a passage having a circular section. The hydraulic diameter is expressed as the following equation.

$$D_h = \frac{4 \times \text{Area}}{\text{Wet Length}}$$

Therefore, the hydraulic diameter of the dual-cooling nuclear fuel rod sub channel A is 8.105 mm, and the hydraulic diameter of the guide thimble sub channel B is 9.047 mm. The ratio of the hydraulic diameter of the dual-cooling nuclear fuel rod sub channel A to the hydraulic diameter of the guide thimble sub channel B is 1:1.12. Due to the flow split, a little loss is generated in the flow toward the dual-cooling nuclear fuel rod 10, but it seems that the loss can be compensated by the flow in the inside of the dual-cooling nuclear fuel rod 10.

The upper portion of the guide thimble having the dual tube type structure must be separated from the upper end fitting 120, instead of being integrally formed with the upper end fitting 120, in order for maintenance of the nuclear fuel assembly 100 and replacement of a damaged nuclear fuel rod.

In particular, if the nuclear fuel rod is damaged during the operation of the nuclear reactor, a radioactive material contained in the nuclear fuel rod may leak out to a coolant. If such a damage occurs, the nuclear fuel assembly 100 is released from the nuclear reactor, the damaged nuclear fuel rod is removed, and a new nuclear fuel rod is inserted into the corresponding position. Since this repair process has a significant influence on a reload time of the nuclear fuel assembly 100, the repair process of the nuclear fuel assembly 100 must be performed easily and promptly.

In order for the separable connection between the upper portion of the guide thimble 20 having the dual tube type structure and the upper end fitting 120, a cylindrical flange 40 is put on the upper portion of the inner guide thimble 25, and the flange 40 is fixed by welding along the upper perimeter of the inner guide thimble 25.

Thereafter, the outer diameter portion of the flange 40 is connected to the inner diameter portion of the outer guide thimble 30 by welding.

At this point, it is preferable that a dimension of the outer diameter portion of the flange 40, which is welded to the inner diameter portion of the outer guide thimble 30, is a somewhat loose fit so that the welding is facilitated.

In addition, a female screw is formed in the upper inside of the flange 40 and is screwed to a male screw that is formed in the outer diameter portion of an outer guide post 121.

In a state that a groove is formed on the lower portion of the passage plate 124 of the upper end fitting 120 and the upper end of the outer guide thimble 30 is inserted into the groove, an entire assembly can be configured through the screw connection of the inner guide thimble 25 and the outer guide post 121.

The upper portion of the guide thimble configured with the inner guide thimble 25, the flange 40 and the outer guide thimble 30 formed in one body contacts the stepped portion formed in the lower portion of the passage plate 124 of the upper end fitting 120, and the male screw formed in the outer diameter portion of the outer guide post 121 is screwed to the female screw formed in the inner diameter portion of the flange 40.

In addition, the lower portion of the guide thimble 20 having the dual tube type structure is connected to the lower end fitting 130 through an end fitting 50 inserted into the lower end fitting 130.

The end fitting 50 has a cylindrical large-diameter portion at the upper portion, and a small-diameter portion at the lower portion having a small outer diameter than the large-diameter portion. A male screw is formed on an outer periphery of the small-diameter portion.

Furthermore, a groove having a predetermined depth is formed on the upper portion of the end fitting 50 to receive the inner guide thimble 25. After the inner guide thimble 25 is received in the groove, it is welded to the groove.

Moreover, the stepped portion is formed on the outer periphery of the large-diameter portion of the ending fitting 50 along the perimeter such that the outer guide thimble 30 is fit. After the outer guide thimble 30 is fit into the stepped portion, it is welded to the stepped portion.

As shown in FIG. 9, in order to connect the lower end fitting 130 to the guide thimble 20 having the dual tube type structure where the end fitting 50 is welded, the end fitting 50 welded at the lower portion of the guide thimble having the dual tube type structure is coupled to a nut 60 having a flange surface on the top surface. In order to prevent the lease of the nut 60, a locking disc 70 having an annular shape is tightly attached to the outer periphery of the nut 60, and a position contacting the lower end fitting 130 is welded. Therefore, it is possible to prevent the guide thimble 20 having the dual tube type structure from being separated from the lower end fitting 130.

Therefore, the upper portion of the guide thimble and the upper end fitting 120 can be coupled and separated by welding the flange 40 to the upper portion of the inner guide thimble 25 and allowing the screw connection of the flange 40 and the outer guide post 121 of the upper end fitting 120. In this case, in a state that a groove is formed on the lower portion of the passage plate 124 of the upper end fitting 120 and the upper end of the outer guide thimble 30 is inserted into the groove, an entire assembly can be configured through the screw connection of the inner guide thimble 25 and the outer guide post 121.

The important functional requirements of the guide thimble are to provide the insertion path of the control rod 160 for the power control of the reactor core and the trip of the reactor core and to maintain the structural integrity of the whole nuclear fuel assembly 100. Therefore, the coolant discharge holes 35 are penetrated through the upper end and the lower end of the inner guide thimble 25 and the outer thimble 30.

According to the present invention, since the guide thimble having the dual tube type structure of the nuclear fuel assembly having the dual-cooling nuclear fuel rod is adopted, the hydraulic diameter of the guide thimble sub channel is similar to the hydraulic diameter of the dual-cooling nuclear fuel rod sub channel, and the neutron absorption section can be minimized because of the dual tube type structure.

If a difference between the hydraulic diameter of the guide thimble such channel and the dual-cooling nuclear fuel rod sub channel is within 15%, it is possible to reduce the influence due to the flow unbalance between the guide thimble sub channel and the dual-cooling nuclear fuel rod sub channel.

Furthermore, the outer guide thimble of the guide thimble having the dual tube type structure increases a second moment of area. Thus, if a bending load is applied to the side of the nuclear fuel assembly, its resistant stiffness increases and thus the resistance against the external load is considered.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A nuclear fuel assembly, comprising a plurality of dual-cooling nuclear fuel rods and guide thimbles,
    each of the guide thimbles comprising:
    an inner guide thimble configured to receive a neutron deceleration control rod;
    an outer guide thimble configured to receive the inner guide thimble; and
    a cylindrical end fitting, comprising:
    a circumferential groove formed on a top surface of the end fitting, a lower portion of the inner guide thimble being inserted therein and securely coupled, and
    a stepped portion formed in an outer periphery of the end fitting, a lower portion of the outer guide thimble being inserted thereon and securely coupled, and
    a male screw formed on an outer periphery of the cylindrical end fitting.

2. The nuclear fuel assembly of claim 1, further comprising:
    a dual-cooling nuclear fuel rod sub channel surrounded by four adjacent dual-cooling nuclear fuel rods to provide a coolant flow path; and
    a guide thimble sub channel surrounded by one guide thimble and twelve dual-cooling nuclear fuel rods arranged around the guide thimble to provide a coolant flow passage,
    wherein a difference between a hydraulic diameter of the dual-cooling nuclear fuel rod sub channel and a hydraulic diameter of the guide thimble sub channel is within 15%.

3. The nuclear fuel assembly of claim 1, further comprising:
    a nut having a flange surface at an upper portion of the nut such that the nut is coupled to the male screw of the end fitting; and
    a locking disc closely attached to an outer surface of the nut,
    wherein the locking disc is attached to a lower surface of the lower end fitting of the nuclear fuel assembly.

4. The nuclear fuel assembly of claim 2, further comprising a flange at an upper portion of the guide thimble, wherein a lower end of the flange is disposed on the upper end of the inner guide thimble; and an outer of the flange is connected to an inner diameter of the outer guide thimble by welding; and
    a female screw formed in the inner diameter portion of the flange.

5. The nuclear fuel assembly of claim 4, wherein the flange is coupled to a passage plate of an upper end fitting of the nuclear fuel assembly.

* * * * *